(No Model.)
W. T. GILLEN.
ROPE FASTENER.
No. 588,903. Patented Aug. 24, 1897.
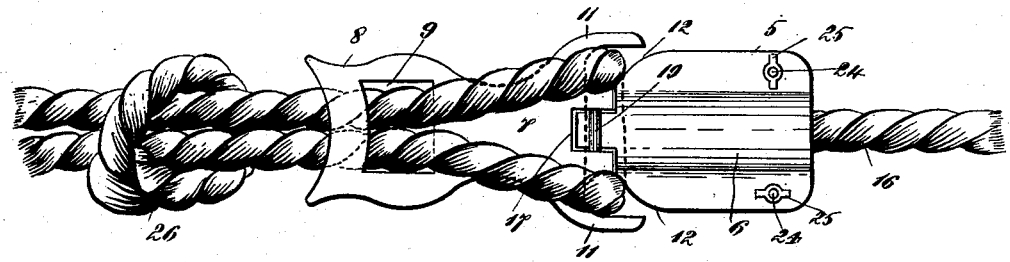
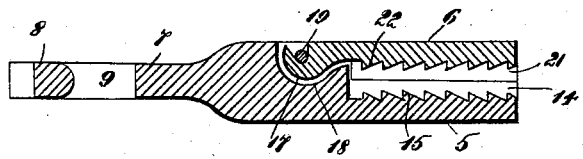
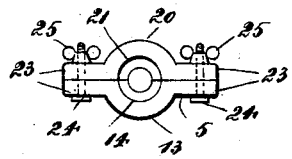
WITNESSES
INVENTOR
William T. Gillen
BY
Edgar Tate & Co
ATTORNEYS United States Patent Office.

WILLIAM T. GILLEN, OF JERSEY CITY, NEW JERSEY.

ROPE-FASTENER.

SPECIFICATION forming part of Letters Patent No. 588,903, dated August 24, 1897.

Application filed August 20, 1896. Serial No. 603,358. (No model.)

*To all whom it may concern:*

Be it known that I, WILLIAM T. GILLEN, a citizen of the United States, and a resident of Jersey City, in the county of Hudson and State of New Jersey, have invented certain new and useful Improvements in Means for Fastening the Separate Ends of Clothes-Lines and other Lines or Cables, of which the following is a specification, reference being had to the accompanying drawings, forming a part thereof, in which similar numerals of reference indicate corresponding parts wherever found throughout the several views.

This invention relates to means for fastening the separate ends of clothes-lines and other lines or cables where it is designed to use an endless line or cable which is mounted on pulleys or similar supports; and the invention is fully disclosed in the following specification, of which the accompanying drawings form a part, in which—

Figure 1 is a plan view of my improved fastening device, showing the method of securing the ends of the line or cable thereto; Fig. 2, a central longitudinal section of the fastening device, and Fig. 3 an end view thereof.

In the practice of my invention I provide a device for connecting the ends of a line or cable, which consists of a head 5, provided with a hinged jaw 6 and with an extension or shank 7, the outer end of which is enlarged, as shown at 8, and provided with an opening 9, and formed adjacent to the outer inner end of the extension or shank 7 are outwardly-curved hooks or projections 11, and the end of the head 5 adjacent to said hooks or projections is inwardly curved or cut away on the opposite sides thereof, as shown at 12.

The head 5 is provided with a semicircular longitudinal enlargement 13, in the inner side of which is formed a semicircular groove 14, which is provided with inwardly and backwardly directed semicircular teeth or projections 15, and the hinged or pivoted jaw 6 is provided at its rear end with a downwardly-directed hook or projection 17, and formed in the rear end of the head 5 is a semicircular cavity or recess 18, provided with a transverse pin or bolt 19, and the hinged jaw 6 is connected with the head 5 by passing the hook or projection 17 beneath said pin or bolt, as shown in Fig. 2. The hinged jaw 6 is also provided centrally thereof with a longitudinal semicircular enlargement 20, in the inner side of which is formed a semicircular longitudinal groove 21, which is also provided with backwardly-directed semicircular teeth or projections 22, and the grooves 14 and 21 in the head 5 and the jaw 6 thereof form a circular opening which is adapted to receive the end 16 of the line or cable, and said hinged jaw 6 and the head 5 are provided with side flanges 23, which are secured together by bolts 24, provided with nuts or burs 25.

In connecting the separate ends of the line or cable one end, as shown at 16, is inserted into the circular opening formed by the grooves 14 and 21 in the head 5 and the jaw 6, and said parts are then firmly clamped together by means of the bolts 24 and the nuts or burs 25, and the inwardly and backwardly directed teeth or projections 15 and 22 securely hold said end of the line or cable. The other end of the line or cable is passed through the opening 9, through the space formed by one of the hooks or projections 11, then crosswise of the shank or projection 7, then through the space formed by the other hook or projection 11, and then back through the opening 9 and is tied to or otherwise connected with the main part of the line or cable, as shown at 26. By this means the separate ends of the line or cable are securely connected, and it is evident that the same may be disconnected whenever desired by releasing the nuts or burs 25 and disconnecting the opposite end of the line or cable from the shank 7.

My improved fastening device is preferably composed of metal and is well adapted to accomplish the result for which it is intended, and is also comparatively inexpensive, and my invention is not limited to the exact form of the various parts of the fastening device as herein described, as it is evident that changes therein and modifications thereof may be made without departing from the spirit of my invention or sacrificing its advantages.

Having fully described my invention, I claim as new and desire to secure by Letters Patent—

The herein-described fastening device, for connecting the ends of a line or cable, which consists of a head provided with a hinged or pivoted jaw, which is adapted to be bolted to said head, said jaw and said head being provided with a central longitudinal circular opening, adapted to receive one end of the line, and provided with inwardly and backwardly directed teeth or projections, and said head being also provided at one end with a shank in which is formed an opening through which the opposite end of the line is adapted to be passed, and with hooks or projections formed on said shank adjacent to said head, through which said line is also adapted to be passed, substantially as shown and described.

In testimony that I claim the foregoing as my invention I have signed my name, in presence of the subscribing witnesses, this 18th day of August, 1896.

WILLIAM T. GILLEN.

Witnesses:
JOSEPH A. COLLINS,
GEORGE W. MEEK.